UNITED STATES PATENT OFFICE.

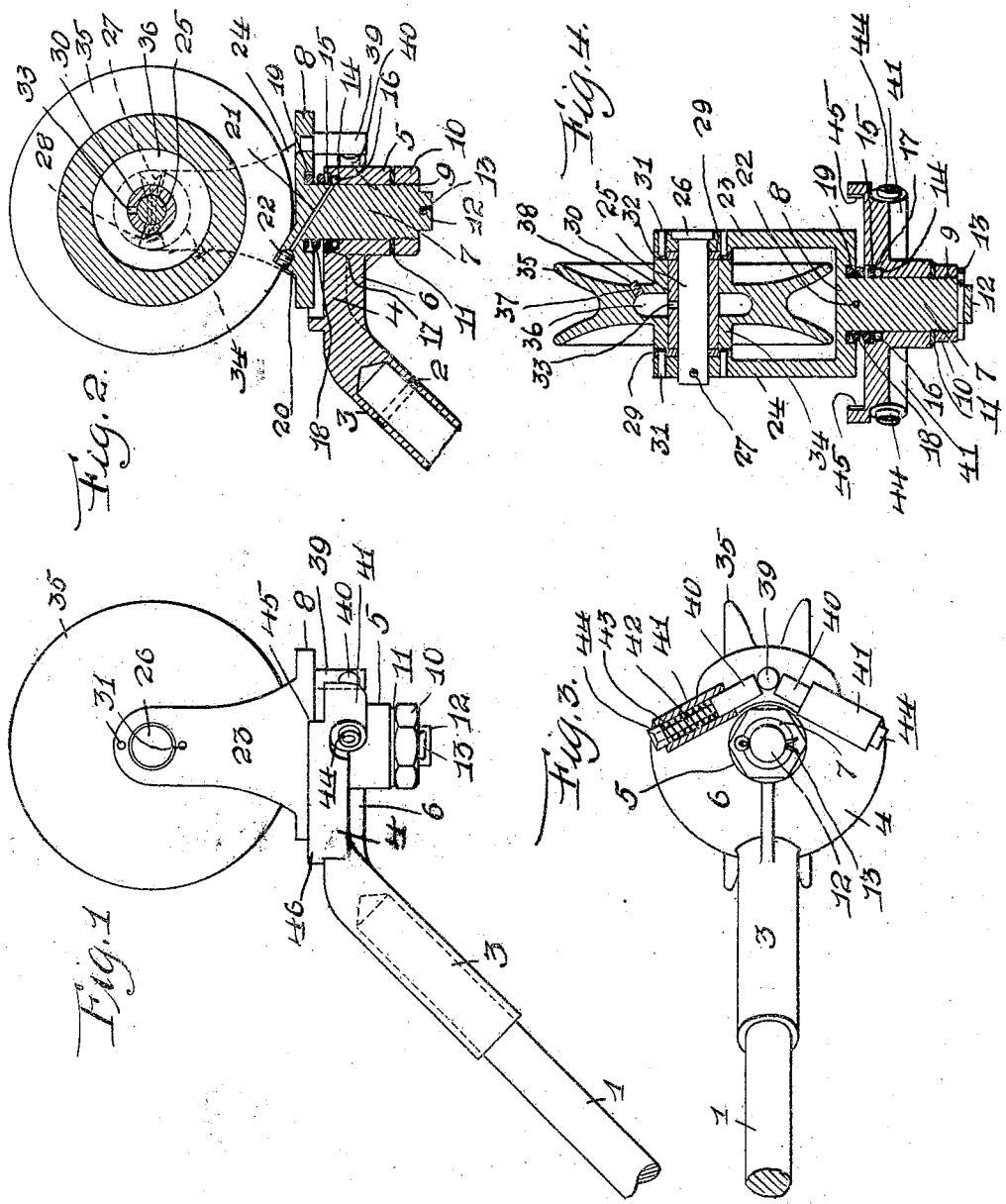
V. PEDERSEN.
TROLLEY.
APPLICATION FILED FEB. 13, 1911.
991,231.
Patented May 2, 1911.
WITNESSES
Samuel Payne
K. H. Butler
INVENTOR
V. Pedersen.
N. C. Evert & Co.
by Attorneys

VALDEMAR PEDERSEN, OF TURTLE CREEK, PENNSYLVANIA.

TROLLEY.

991,231.   Specification of Letters Patent.   Patented May 2, 1911.

Application filed February 13, 1911. Serial No. 608,221.

*To all whom it may concern:*

Be it known that I, VALDEMAR PEDERSEN, a subject of the King of Denmark, residing at Turtle Creek, in the county of Allegheny and State of Pennsylvania, have invented certain new and useful Improvements in Trolleys, of which the following is a specification, reference being had therein to the accompanying drawing.
This invention relates to trolleys, and the objects of the invention are to furnish a trolley pole with a novel harp that will allow the wheel thereof to adjust itself to the curvature or angle of a trolley wire, and to provide a swiveled harp that is yieldably held in longitudinal alinement with the trolley pole.

Further objects of the invention are the provision of novel means in connection with a harp whereby the journal of the trolley wheel can be thoroughly lubricated, and to provide a simple, durable and inexpensive trolley that will normally remain in engagement with a trolley wire, particularly when a car is traveling around a curve at considerable rapidity, and when irregularities are encountered in the trolley wire.

With these and other objects in view, the invention resides in the novel construction, combination and arrangement of parts to be hereinafter specifically described and then claimed.

Reference will now be had to the drawing, wherein:—
Figure 1 is a side elevation of the trolley, Fig. 2 is a longitudinal sectional view of the same, Fig. 3 is a bottom plan of the trolley, partly in section, and Fig. 4 is a vertical cross sectional view of the trolley.
Like numerals of reference designate corresponding parts throughout the several views.

The reference numeral 1 denotes the upper end of a trolley pole and mounted upon the upper end of said pole and retained thereon by a transverse pin or rivet 2 is the socket 3 3 of a support 4, said support being substantially semi-circular in plan and disposed at an angle to the socket 3. The support 4 has the forward edge thereof provided with a vertical socket 5 depending from said support and connected to the socket 3 by a longitudinal web 6.

Rotatably mounted in the socket 5 is a vertical pin 7 of a harp plate 8, said pin having the lower end thereof screw threaded, as at 9 to receive a nut 10, and interposed between said nut and the lower end of the socket 5 is a washer 11. The end of the pin 7 is reduced, as at 12 and provided with a transverse cotter pin 13 adapted to prevent accidental displacement of the nut 10.

The upper end of the socket 5 is cut away to provide shoulders 14 and 15 and arranged upon the shoulder 14 are anti-friction balls 16, while upon the shoulder 15 and the balls 16 there is arranged a washer 17, the balls 16 movably supporting the washer 17 upon the shoulder 15. The washer 17 supports the lower convolution of a coiled spring 18 encircling the pin 7, the upper convolution of said spring extending into an annular groove 19 provided therefor in the bottom of the harp plate 8.

The harp plate 8 is provided with an enlargement 20, said enlargement, plate and pin having an angularly disposed port 21 formed therein, the upper end of the port being enlarged and the walls thereof threaded to receive a plug 22, the lower end of the port terminates at the anti-friction balls 16 and it is through the medium of this port that a suitable lubricant can be placed upon the shoulder 14 to insure an easy movement of the anti-friction balls.

The harp plate 8 is provided with vertical oppositely disposed arms 23 and 24, said arms supporting a transverse journal pin 25 having the headed end 26 thereof countersunk in the arm 23 and the opposite end thereof fixed in the arm 24 by a cotter pin 27, the arm 24 being cut away, as at 28 whereby the cotter pin can be easily driven through the journal pin 25. Mounted upon the pin 25 between the arms 23 and 24 are washers 29 and a rotatable sleeve 30. The washers 29 are prevented from rotating by pins 31 mounted in the arms 23 and 24 and extending into openings 33 in the washers 29. The sleeve 30 is provided with a lubricant port 33 and upon said sleeve is rotatably mounted the hub 34 of a trolley wheel 35, said wheel having an annular lubricant compartment 36 in communication with the port 33, said compartment constituting a lubricant reservoir that is filled through the medium of an opening 37 in the side of the wheel. The opening 37 is normally closed by a plug 38.

The harp plate 8 is provided adjacent to the forward edge thereof with a depending pin 39, and engaging said pin are spring pressed plungers 40 movably mounted in casings 41, formed integral with the under side of the support 4. The plungers 40 have the rear ends thereof reduced, as at 42 and encircling the reduced ends 42 are coiled compression springs 43 arranged within the casings 41, said springs being retained therein by plugs 44 in which the reduced ends 42 are movably supported.

The harp plate 8 is rectangular in plan and is limited in its movement by the ends 45 of a vertical flange 46, carried by the support 4.

The spring 18 serves functionally to cushion the harp plate 8 and said harp plate is normally held in longitudinal alinement with the socket 3 and the pole 1 through the medium of the spring pressed plungers 40 engaging the depending pin 39 of said plate.

It is apparent that the wheel 35 can be readily adjusted to the curvature of a trolley wire when a car or vehicle is passing around a curved section of road.

The trolley is made of strong and durable metal, and while in the drawing there is illustrated a preferred embodiment of the invention, it is to be understood that the structural elements thereof are susceptible to such changes as fall within the scope of the appended claim.

What I claim is:—

In a trolley, a support, a depending socket carried by said support, a pin rotatably mounted in said socket, a harp plate carried by said pin, arms carried by said plate, a wheel revolubly mounted between said arms, a depending pin carried by said harp plate, and yieldable plungers carried by said support and adapted to engage said pin, substantially as described.

In testimony whereof I affix my signature in the presence of two witnesses.

VALDEMAR PEDERSEN.

Witnesses:
MAX H. SROLOVITZ,
CHRISTINA T. HOOD.